United States Patent Office 3,660,502
Patented May 2, 1972

3,660,502
HALOGEN-CONTAINING POLYOLS AND POLY-URETHANES PREPARED THEREFROM
Leslie Catron Case, 14 Lockeland Road,
Winchester, Mass. 01890
No Drawing. Filed May 13, 1968, Ser. No. 728,824
Int. Cl. C07c 43/30
U.S. Cl. 260—615 A
10 Claims

ABSTRACT OF THE DISCLOSURE

Novel polyols having a substantial halogen content and having good thermal stability are prepared by the reaction of hemiacetals or hemiketals of lower aliphatic halogenated aldehydes or ketones, and monoepoxides. These halogen-containing polyols are further reacted to prepare flame-resistant polyurethane compositions.

BACKGROUND OF THE INVENTION (1) Field of the invention

This invention relates to compositions containing terminally reactive hydroxyl groups and substantial amounts of halogen radicals. More specifically, this invention is concerned with the reaction products of lower aliphatic monoepoxides with hemiacetals or hemiketals of halogen-containing lower aliphatic aldehydes or ketones respectively, and the cross-linked polyurethane compositions prepared therefrom.

(2) Descrpition of the prior art

Polyurethane compositions have found numerous commercial applications in the form of rigid and flexible foams, castings, coatings and fibers. However, the flammability and combustibility of polyurethane compositions has limited and, in some instances altogether prevented, use of these materials in many applications. The prior art describes attempts to provide compositions with improved resistance to ignition and flame propagation. Specifically, the use of additives such as compounds of phosphorus, antimony, and bismuth to impart flame resistance has been described. Many of these additives are quite toxic, however, and they are often immiscible with the other components of the formulation.

The incorporation of phosphoro, chloro, or bromo radicals as an integral part of the polyol structure has also been found to be very effective in increasing the flame resistance of the crosslinked polyurethane composition prepared therefrom. Polyols in which these radicals are incorporated, however, frequently possess undesirably high viscosities and are often incompatible with the polyisocyanates in common use. Impairment of physical properties, such as increased friability or decreased resistance to humid aging, of the cross-linked polyurethane compositions prepared from such polyols has also been observed. Introduction of halo radicals moreover generally necessitates relatively expensive starting materials, such as epihalohydrins, or halogenated polycarboxylic acids and anhydrides thereof, many of which exhibit poor chemical reactivity in polyol formation. In addition to undesirably high cost such monomers also possess a relatively low content of halo radicals on a weight basis.

The prior art records attempts to utilize monomers which are lower in cost and contain a greater weight percent of halogen. Specifically, U.S. Pat. 3,137,661 and British Pat. 1,037,323 describe the formation of polyurethane foams from hemiacetals prepared by the reaction of monomeric polyhydric alcohols, such as glycerol or sorbitol, and 1,1,1-trichloroacetaldehyde, also known, and hereinafter referred to, as chloral. While these chlorohemiacetals are desirably inexpensive, they unfortunately suffer from several disadvantages which preclude their use in current commercially acceptable formulations. Specifically, these adducts are thermaly unstable and re-dissociate into chloral and the alcohol at elevated temperatures. In fact some free chloral is split off during the exothermic foaming step and this may result in undesirable friability in the rigid foam. Many of these polyols are also incompatible with some of the common polyisocyanates preferred in the art. In addition these chlorochemiacetal polyols are extremely viscous at room temperature, making it difficult or impossible to mix these polyols properly with the other components of the foam formulation, such proper mixing being essential to the production of good-quality foams with uniform pore structure and strength. Heating these polyols to an elevated temperature at which they would become sufficiently fluid for use in conventional foaming equipment not only entails all the common disadvantages of such a heating step, such as special equipment, inability to use the preferred low-boiling blowing agents, etc., but also results in decomposition of the thermally unstable adduct.

SUMMARY OF THE INVENTION

The present invention provides novel polyols which possess good thermal stability and which contain substantial amounts of halogen. These polyols are prepared from inexpensive reactants and possess desirably low viscosities and good compatibility with polyisocyanates and they yield polyurethane compositions with excellent resistance to flame propagation.

The novel polyols are reaction products of saturated lower aliphatic 1,2-monoepoxides and halogen-containing hemiacetals or hemiketals which in turn are formed by the addition of polyhalogeneous lower aliphatic aldehydes or ketones to aliphatic polyalcohols or polythiols. The instant polyols are characterized by having functionalities ranging from at least two to generally not more than about eight and by having equivalent weights varying from at least about 75 to about 1500 with hydroxyl numbers ranging from about 35 to about 750.

The hydroxyl-terminated compositions of the present invention are prepared by coreacting (1) a member selected from the group consisting of hydrates, sulfhydrates, hemiacetals, hemithials, hemiketals and hemithioketals of lower aliphatic aldehydes and ketones containing at least two halo substituents selected from the group consisting of fluoro, chloro, and bromo radicals with (2) a saturated lower aliphatic monoepoxide. The resulting polyols are essentially composed of four members: a central core (A) which consists of a residue Y—(X—)$_f$ of an aliphtaic polyalcohol or polythiol of the general formula Y—(XH)$_f$ wherein Y is the organic residue attached to the hydroxyl or sulfhydryl radicals of the polyalcohol or polythiol, X is selected from the group consisting of —O— and —S— and $f$ represents the functionality of the polyalcohol or polythiol and is an integer having a value of at least two, attached thereto units (B) of the general structural formula

wherein R is selected from the group consisting of hydrogen and lower aliphatic polyhalogeneous radicals having from one to 6 carbon atoms and having at least two halo radicals selected from the group consisting of fluoro, chloro, and bromo radicals and R$_1$ is a lower aliphatic polyhalogeneous radical having from one to 6 carbon atoms and at least two halo radicals selected from the group consisting of fluoro, chloro, and bromo radicals, units (C) of the general formula —(R$_2$—O)$_m$— wherein $R_2$ is a lower aliphatic 1,2-alkylene radical of from two to six carbon atoms and $m$ is an integer having a value of at least one, and (D) terminal hydrogen radicals. Desirable compositions will contain about 0.1 to ten mols of said B units per mol of —X— radicals and the molar ratio of said C units to said B units will range from at least one to about three.

DESCRIPTION OF THE PREFERRED EMBODIMENT

The polyhalogeneous hemiacetals and hemiketals which are preferred for the preparation of the polyols of the present invention are adducts of polyhalogeneous saturated lower aliphatic carbonyl compounds and aliphatic polyalcohols having at least two hydroxyl radicals. For the preparation of polyols suitable for use in rigid polyurethane formulations hemiacetals and hemiketals derived from polyalcohols having at least three and more preferably at least four hydroxyl radicals are advisably employed.

Suitable adducts are those having the general structural formula

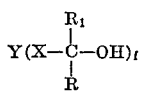

wherein Y, X, R, and $R_1$ have the previously assigned meaning and $f$ is an integer having a value of at least two. These adducts are prepared by conventional methods known to the art by intimately mixing the polyhalogeneous lower aliphatic aldehyde or ketone with the aliphtaic polyalcohol. Hemiacetal or hemiketal formation may proceed spontaneously and exothermally upon mixing the two reactants at room temperature or may require gentle heating for initiation. Temperatures in excess of 100° C. are generally not required. Hemithials and hemithioketals resulting from the addition of polyhalogeneous lower aliphatic aldehydes or ketones to polythiols may also be employed and are of value in certain instances. The polyhalogeneous saturated lower aliphatic aldehydes and ketones which are preferred for use in preparing suitable hemiacetal or hemiketals are those having from two to 7 carbon atoms and from two to 14 halogen radicals selected from the group consisting of fluoro, chloro, and bromo radicals. Examples of preferred halocarbonyl compounds are trichloroacetaldehyde, also known as chloral, tribromoacetaldehyde, also known as bromal, dichloroacetaldehyde, dibromoacetaldehyde, 2,2,2-trichloropropionaldehyde, pentachloropropionaldehyde, 2,2,2-tribromopropionaldehyde, pentabromopropionaldeyhde, hexachloroacetone, hexafluoroacetone, hexabromoacetone, pentafluoropropionaldehyde and heptafluorobutyraldehyde. Particularly preferred for use are adducts derived from chloral, bromal, and hexachloroacetone. Polyalcohols suitable for preparing hemiacetals and hemiketals useful in the present invention are the polyfunctional aliphatic alcohols having from two to fifteen carbon atoms and from two to eight hydroxyl groups. The hemiacetals or hemiketals which are suitable for preparing polyols for use in rigid polyurethane formulations are advisably prepared from aliphatic polyalcohols having at least three, and more preferably, at least four, hydroxyl radicals. Particularly preferred for use in the present invention are hemiacetals or hemiketals derived from saturated aliphtaic polyalcohols having from three to six carbon atoms and from three to six hydroxyl radicals, and mixtures thereof.

Representative of the preferred aliphatic polyalcohols which may be employed to prepare hemiacetals or hemiketals which lead to polyols suitable for use in rigid polyurethane formulations are, among others, glycerol, diglycerol, trimethylolethane, trimethylolpropane, 1,2,6-hexanetriol, pentaerythritol, dipentaerythritol, tripentaerythritol, sorbitol, xylitol, mannitol, and inositol. Especially useful is a commercially available mixture of linear polyols having from three to six carbon atoms, an average molecular weight of about 160 and an average equivalent weight of about 32. Other mixtures of polyols may advantageously be used.

While the afore-mentioned aliphatic polyalcohols are preferred for use, other aliphatic compounds carrying hydroxyl radical substituents, such as mono- and polysaccharides, and particularly mixtures thereof with polyalcohols, may also be of value. In each instance the utility of the resulting polyol is dependent on its viscosity, and if the viscosity of the product based on the mixture of polyalcohols does not exceed a value which can conveniently be handled, then the hemiacetal from such a mixture may be advantageously employed. Thus, hemiacetals or hemiketals resulting from addition of the aforementioned polyhalogeneous carbonyl compounds and monosaccharides, such as dextrose or methylglycoside, or disaccharides, such as sucrose, or higher polysaccharides, such as dextrins and starches, the hydrate and alcoholic solutions thereof may also be of value. Solutions containing not more than 50 percent by weight of such compounds in aliphatic polyalcohols are of special merit, although such solutions having up to 70 percent by weight of saccharide may sometimes be used.

Hemiacetals and hemiketals derived from difunctional alcohols, such as for example, ethylene glycol, propylene glycol or butylene glycol, or ether glycols such as diethylene glycol, triethylene glycol, dipropylene glycol, tripropylene glycol, and polypropylene glycols are also of value in preparing polyols suitable for use in flexible polyurethane compositions and polyurethane coatings. Adducts of water, such as chloral hydrate, and of hydrogen sulfide may also be of value in certain instances.

Adducts prepared from mixtures of polyalcohols and/or mixtures of polyhalogeneous carbonyl compounds may be employed and are sometimes preferred. Particularly preferred are hemiacetal mixtures prepared using mixtures of chloral and bromal, of chloral and dichloroacetaldehyde, and of bromal and dibromoacetaldehyde. Most preferred for use in the present invention are hemiacetals derived from chloral or bromal and glycerol.

Epoxides preferred for use are the saturated lower aliphatic terminal 1,2-monoepoxides having from two to six carbon atoms and having the general structural formula

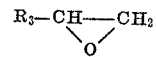

wherein $R_3$ is selected from the group consisting of hydrogen, lower alkyl radicals and lower haloalkyl radicals. Examples of suitable epoxides are ethylene oxide, propylene oxide, 1,2-butylene oxide, 1-chloro-2,3-epoxypropane also known as epichlorohydrin, 1,1-dichloro-2,3-epoxypropane, 1,1,1-trichloro-2,3-epoxypropane, 1-bromo-2,3-epoxypropane also known as epibromohydrin, and 3,4-dibromo-1,2-epoxybutane. The epoxides most preferred for use are ethylene oxide and propylene oxide because of their ready availability and high reactivity. Mixtures of epoxides may be employed.

The thermally stable novel polyols of the present invention are produced by the addition reaction of the above-described monoepoxides to the afore-mentioned hemiacetals or hemiketals. The production of polyols within the scope of the present invention may be carried out in two separate steps or they may be prepared directly in a single operation.

In one embodiment, the reaction between the preformed hemiacetal or hemiketal and the monoepoxide is effected by intimately admixing the two reactants, preferably in a well-stirred, sealed reactor, and heating them within a temperature range of at least about 75° C. to about 175° C., and preferably at least about 90° C. to about 150° C. for a time sufficient to complete the addition reaction. The reaction time frequently ranges from about one hour to about 24 hours, but may exceed 24 hours in some instances. Reaction pressures may vary from atmospheric pressure to about 300 pounds per square inch depending on the reaction temperature and the nature of the epoxide employed. Quite surprisingly the addition reaction proceeds readily in the absence of any catalysts. Small amounts of catalysts, such as stannous salts, tertiary amines, and mild Lewis acids such as zinc and ferric chlorides, may be added, however, if desired. The amount of epoxide employed is generally in excess of that theoretically required to add one mole of epoxide per acetal or ketal branch chain. Thus, from about one to about five moles of epoxide per mole of carbonyl compound residue in the hemiacetal or ketal are preferably employed. As a general rule, the amount of epoxide residues which can become combined depends on the amount of combined residues of hemiacetal or hemiketal. It is disadvantageous to leave any uncapped hemiacetal or hemiketal residues in the instant product, and thus the desirable lower limit for the ratio of combined epoxide residues to the combined hemiacetal or hemiketal residues is one. At the upper limit of epoxide, the rate of reaction of the epoxide slows down considerably once the reactive hydroxyl groups of the hemiacetal or ketal have undergone reaction. Thus it is difficult to react more than about 3.0 mols of epoxide per mol of polyhalogeneous aldehyde or ketone. And the amount of epoxide which becomes chemically combined will preferably vary from about 1.0 to 2.0 mols, and more preferably from about 1.0 to 1.5 mols per mol of aldehyde or ketone residues in the hemiacetal or hemiketal.

Since the reaction of the polyhalogeneous carbonyl compounds with the aliphatic polyalcohols proceeds more rapidly than the addition of the epoxide to the hemiacetal or hemiketal it is also possible to prepare useful polyols within the scope of the present invention in one step by mixing and heating together the polyalcohol, the polyhalogeneous carbonyl compound and the epoxide. In this embodiment of the invention the hemiacetal or hemiketal is first formed, in situ, and then reacts further with the epoxide to form the terminal oxyalkylene units. The one-step preparation is essentially conducted under the same conditions of temperature and pressure described hereinabove using the preformed adduct, and in general, the same total reactant ratios are useful. Since the hemiacetal and hemiketal linkages are thermally unstable, and at least partially dissociate at the temperature of the epoxide addition reaction, it is frequently found that the amount of aldehyde or ketone becoming chemically combined is less than one mol per hydroxyl or sulfhydryl group in the polyalcohol or polythiol compound. Thus, generally from about 0.1 to 0.75 mol of polyhalogeneous aldehyde or ketone is found to be combined per equivalent of hydroxyl or sulfhydryl radicals, and the excess employed is generally recovered. When a considerable molar excess of epoxide over the polyhalogeneous carbonyl compound is employed, and when strenuous reaction conditions are used, it is possible to combine as much as 10 mols of polyhalogeneous aldehyde or ketone per hydroxyl or sulfhydryl radical. Specifically, if from 2.0 to 5.0 mols of epoxide per mol of polyhalogeneous carbonyl residue is employed, and the reaction is run for either an extended length of time, or at a more elevated temperature, it becomes possible to combine up to 10 mols of polyhalogeneous carbonyl compound per hydroxyl or sulfhydryl radical in the original polyalcohol or thiol. In this latter case of high ratios of combined polyhalogeneous compound per polymer chain formed, the resulting polymer branch chains will consist of repeating acetal-ether segments of the general formula:

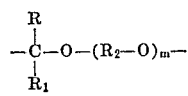

The hydroxyl-terminated compositions prepared as described herein-above are pale yellow to amber fluids which possess excellent thermal stability and do not redissociate into the polyhalogeneous carbonyl compounds from which they are derived. The viscosities of the preferred polyols will range from about 5000 centipoises to generally not more than about 200,000 centipoises at 25° C. which is the approximate upper limit for easy handling using standard equipment. Useful compositions will have equivalent weights ranging from 75 to 1500, and more preferably from 90 to 1200 and with hydroxyl numbers varying from 35 to 750. The preferred polyols of the present invention are composed of:

(A) The residues $Y(O-)_f$ of the aliphatic polyhydroxy compound, $Y(OH)_f$, (B) The residues of the lower aliphatic polyhalogeneous carbonyl compound

and (C) The terminal epoxide-derived radicals

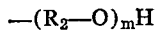

The most preferred compositions are those in which said (A) residues are derived from aliphatic polyalcohols having from 2 to 6 carbon atoms and from 2 to 6 hydroxy groups, said (B) residues are derived from chloral, bromal, hexachloroacetone, or hexafluoroacetone, and said (C) units are derived from ethylene oxide or propylene oxide. Compositions suitable for use in preparing flexible polyurethane compositions will contain from about 0.5 to ten mols of said (B) residues per hydroxyl radical present in the original aliphatic polyhydroxy compound, and from about one to three mols of said (C) units per mol of said (B) residues. Compositions suitable for preparing rigid polyurethane compositions will contain from about 0.1 to about 1.0 mol and more preferably from about 0.25 to 0.75 mol, of said (B) residues per hydroxyl radical in the original aliphatic polyhydroxy compound, and from about 1.0 to 2.0 mols of said (C) units per mol of (B) residues.

Useful compositions may be represented by the general formula:

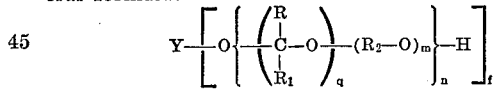

wherein Y, R, $R_1$, $R_2$, $f$ and $m$ have the previously assigned meanings, q is an integer having a value of zero or unity, n is an integer having a value varying from zero to about 20, with the average value of q being at least 0.1 and the average value of n being at least 0.25. The most preferred compositions are those in which R is a radical selected from the group consisting of hydrogen, trichloromethyl and trifluoromethyl, $R_1$ is a radical selected from the group consisting of trichloromethyl, tribromomethyl and trifluoromethyl radicals, and $R_2$ is 1,2-ethylene or 1,2-propylene.

Polyols suitable for the preparation of flexible elastomeric polyurethane compositions will have functionalities of two or three, equivalent weights varying from about 75 to about 1500, and will preferably contain from about three to about 90 percent by weight of said (A) residues, from about 5 to about 80 percent by weight of said (B) residues and from about five to about 50 percent by weight of said (C) units. Polyols preferred for the preparation of rigid polyurethane compositions will have functionalities ranging from three to eight, equivalent weights ranging from about 75 to about 250, and will contain from about 10 to about 30 percent by weight of said (A) residues, from 30 to 80 percent by weight of said (B) residues and from about 10 to about 60 percent by weight of said (C) units.

The hydroxyl-terminated halogen-containing compositions of the present invention are useful as intermediates in the preparation of a variety of fire-resistant thermoplastic and cross-linked resins. They may be esterified to form polyester or alkyd resins or acid-terminated hardening agents for epoxy resins. They are especially useful and most preferably employed, however, in combination with polyisocyanates for the preparation of flame-resistant polyurethane compositions in the form of coatings, castings, elastomers, fibers and particularly flexible and rigid foams. The polyols of the present invention readily permit the preparation of polyurethanes classified as either self-extinguishing or non-burning in the ASTM D–1692 flammability test. Polyols having at least three hydroxyl radicals are especially useful for preparing rigid polyurethane foams and constitute one of the most preferred embodiments of this invention. In comparison to prior art compositions, polyurethanes prepared from the instant polyols are less expensive and exhibit better physical properties.

The polyurethane compositions are prepared from the above-described halogen-containing polyols and organic polyisocyanates by mixing and reacting these materials in accordance with the standard techniques known to the art. For example, references which disclose the preparation of polyurethane foams, and the suitable materials for such preparation are U.S. Pats. 2,779,689; 2,785,739; 2,787,601; 2,788,335; 3,079,350; and the bulletin "Rigid Urethane Foams, II, Chemistry and Formulation" by C. M. Barringer, HR–26, Elastomer Chemicals Department, E. I. du Pont Co., April 1958. The preparation of polyurethane foams, coatings, fibers, castings and elastomers, is further extensively described in two books by J. H. Saunders and K. C. Frisch, "Polyurethanes, Chemistry and Technology" Interscience Publishers, New York, N.Y. Part I, 1962, and Part II, 1964.

Polyurethane compositions with a high degree of flame resistance are suitably prepared by mixing and reacting the instant polyols with polyisocyanates having at least two isocyanato groups under conditions generally used to form polyurethanes. Depending on the particular polyurethane formulation, the polyol-polyisocyanate reaction mixture will also desirably contain other conventional ingredients, such as one or more catalysts, surfactants, blowing agents, pigments, stabilizing agents, phosphorous-containing flame retardants, plasticizers, antioxidants, inert fillers and other additives. Such other components are employed in the standard amounts generally used in the preparation of polyurethanes and can be easily determined for any specific system by a minimum amount of experimentation.

The polyols of the present invention are also advantageously used in admixture with other polyurethane polyols, such as polyether and polyester polyols. Particularly preferred for blending with the present polyols are phosphorous-containing polyols, such as phosphate and polyphosphate esters of propylene glycols, and N,N-bis-hydroxyethyl-O,O-diethyl-aminomethyl phosphonate.

The instant polyols are suitable for use in prepolymer and semi-prepolymer type systems as well as formulations in which all ingredients are combined together simultaneously. Thus, in the preparation of rigid polyurethane foams, for example, it is possible to use the so-called "one-shot" method in which all ingredients of the formulation are combined in one step, or one may employ the prepolymer technique wherein the polyisocyanate is initially reacted with part of the polyol.

The polyisocyanates suitable for the preparation of polyurethane compositions are organic polyisocanates having at least two reactive isocyanato groups, e.g., having a functionality of at least two. Representative of the polyisocyanates which can be used are such compounds as 2,4-tolylene diisocyanate, 2,6 - tolylene diisocyanate, crude tolylene diisocyanates, 1,4 - phenylene diisocyanate, 1,3-phenylene diisocyanate, 1,5 - naphthalene diisocyanate, 4,4′ - diphenylene diisocyanate, 3,3′ - dimethyl - 4,4′ - diphenylene diisocyanate, 4,4′ - diisocyanato diphenylmethane, and 4,4′,4″ - triisocyanato triphenylmethane. Other useful polyisocyanates are polymethylene polyphenylisocyanates produced by phosgenation of multifunctional condensation products of aniline and formaldehyde. Polyisocyanates made by reacting trimethylolpropane or similar polyols with tolylene diisocyanates also may be used. Aromatic diisocyanates are especially useful. Mixtures of polyisocyanates may advantageously be used. Especially preferred for preparation of rigid compositions by reaction with the instant polyols are the polyphenylene polyisocyanates.

Any of the conventional catalysts employed in polyurethane technology can be used as warranted. Some examples of useful catalysts which can be employed are tertiary amines, such as tetramethyl-1,3-butanediamine, triethylene diamine, triethanolamine, N-methylmorpholine, N-ethylmorpholine, tribenzylamine, N,N - dimethylbenzylamine, as well as tin compounds, such as dibutyl tin dilaurate, stannous oleate, stannous octoate, and others.

Conventional blowing agents, which vaporize at or below the temperature of the foaming mass, such as halohydrocarbons exemplified by fluorotrichloromethane (hereinafter referred to as Freon–11), stabilized fluorotrichloromethane (hereinafter referred to as Freon–11B) and dichlorodifluoromethane are used in preparing the rigid foams. Other known blowing agents, such as butane and carbon dioxide, may also be employed.

Any of the various types of surfactants known to be useful in the preparation of cellular polyurethanes may be employed in the process of preparing polyurethane foams according to this invention. Examples of suitable surfactants are castor oil sulfonate, ethylene oxide adducts of sorbitol mono-esters of long-chain fatty acids, ethylene oxide adducts of alkyl phenols, polydimethylsiloxanes, and especially ethylene oxide adducts of polydimethylsiloxanes. These latter compounds, and similar block copolymers of polyglycols and dimethylsiloxane are especially useful for this purpose. U.S. Pat. 2,834,748 describes such especially suitable water-soluble organo-silicone copolymers for use as emulsifying agents. Examples of useful commercially available organo-silicones are DC–113, DC–193, X–520, and Silicone Fluid 199.

The following examples are presented to illustrate, but not to limit the scope of, the present invention:

Example 1

(A) In a 1-liter, stirred pressure vessel was placed 50.9 grams of 99.5% glycerol and 241.7 grams of chloral, and the vessel was closed. Then 3 ounces of ethylene oxide were weighed in and the vessel sealed. The vessel was then heated at 90–100° C. for 5 hours. The vessel was then vented, and the product recovered. The product weighed 527 grams, was straw-colored, and had a viscosity of about 10,000 centipoises at 25° C. The theoretical equivalent weight is 155.

(B) A rigid polyurethane foam was made by mixing 16.2 grams of the above polyol, 11.4 grams of a phosphorus-containing polyol (P–251) having an equivalent weight of 128, a functionality of about four, a viscosity of 2,800 centipoises at 25° C., and a phosphorus content of 5.6%, 0.8 gram of a 20% solution of triethylene diamine in dimethylethanolamine (R–8020), 1.0 gram of a dimethylsilicone-polyethylene glycol block copolymer surfactant, 10.7 grams of fluorotrichloromethane and 29.2 grams of polyphenylene polyisocyanate. The cream time was 6 to 8 seconds, and the rise and tack-free time was 35 seconds. The rigid foam had tiny cells and was quite tough. The core density was about 1.9 pounds per cubic foot. When tested according to the ASTM procedure No. 1692 this foam had a better than minimum non-burning rating.

Example 2

In a one-liter, 316 SS stirred reactor was placed 95 grams of 99.5% glycerol and 146 grams of chloral. The mixture was stirred and allowed to react for 10 minutes to form the hemiacetal. Then 290 grams of propylene oxide were added and the vessel closed. The vessed was then heated for 3 hours at 110–120° C. At the end of this time the excess epoxide was vented, and the product was recovered.

The product weighed 255 grams, and had a theoretical equivalent weight of 82. It was light-colored and had a viscosity of about 20,000 centipoises at 25° C.

Example 3

The experiment of Example 2 was repeated using 280 grams of bromal in place of the chloral, and an equal weight of 1,2-butylene oxide in place of the propylene oxide. The product weighed 415 grams, and had a theoretical equivalent weight of 134.

Example 4

The experiment of Example 2 was again repeated, using 96 grams of a commercial mixture of polyalcohols having from 3 to 6 carbon atoms and 3 to 6 hydroxyl groups, and equivalent weight of 31.9 and an average functionality of 5, in place of the glycerol. The product weighed 250 grams, and had a viscosity of greater than 100,000 centipoises at 25° C.

Example 5

Example 2 was repeated, using 350 grams of epichlorohydrin in place of the propylene oxide and 138 grams of 1,2,6-hexanetriol in place of the glycerol. After completion of the reaction, the product was vacuum stripped at 15 mm. pressure and 125° C. The product weighed 325 grams, and was about twice as viscous as the product of the original Example 2.

Example 6

Example 2 was repeated, using 105 grams of monothioglycerol in place of the glycerol, and 275 grams of bromal in place of the chloral. The reaction resembled that of Example 2, except that the formation of the hemiacetal proceeded at an appreciably faster rate.

This example was repeated using 115 grams of dithioglycerol as the starter. Similar results were obtained.

Example 7

In a one-liter, 316 stainless steel, stirred, pressure vessel was placed 25 grams of ethylene glycol, 208 grams of chloral, and the vessel was closed. Then 115 grams of ethylene oxide was weighed in and the reactor sealed. Then the mixture was heated at 125–140° C. for 3 hours. At the end of this time the excess epoxide and chloral were vented, and the product recovered. The product weighed 233 grams, was dark amber in color, and had a theoretical equivalent weight of 290. About 1.2–1.3 mols of chloral were combined per equivalent of hydroxyl group employed.

The above example was repeated, using 7.5 grams of water in place of the ethylene glycol. The results were similar, except that the reaction required an additional time of about 1 hour.

The above example was again repeated, with 14 grams of hydrogen sulfide being weighed in under pressure, instead of using ethylene glycol. The reaction proceeded similar to that of the original Example 7.

Example 8

In a one-liter, 316 stainless steel, stirred pressure vessel was placed 116.3 grams of ethylene glycol, and the vessel was closed. Then 37 grams of hexafluoroacetone was added, and the vessel allowed to stand until the pressure dropped to atmospheric (indicating that the hexafluoroacetone had been completely converted to the hemiketal). Then 120 grams of ethylene oxide were weighed in and the vessel sealed. The vessel was then heated at 100–125° C. for 2 hours. The vessel was then vented, and the product recovered. The product weighed 205 grams, and was pale straw-colored. The theoretical equivalent weight was 55.

This example was repeated using 70 grams of heptafluorobutyraldehyde in place of the hexafluoroacetone, and 197 grams of diethylene glycol in place of the ethylene glycol. The results were similar.

This example was again repeated using 75 grams of hexachloroacetone in place of the hexafluoroacetone. Similar results were obtained.

Example 9

In a stirred, 316 stainless steel pressure vessel was placed 31.1 grams of 99.5% glycerol, and 610 grams of chloral. Then the vessel was closed, and 385 grams of ethylene oxide were weighed in under pressure. The vessel was sealed, and then heated with stirring for 78 hours at 120–135° C. At the end of this time, the vessel was vented, and the product recovered. The product weighed 735 grams, and was amber colored. The theoretical equivalent weight was 725.

A flexible urethane foam was prepared by mixing 72.5 grams of the above polyol, 100.1 grams of the polyoxypropylene glycol adduct of glycerol, having an equivalent weight of 1010, 8.0 grams of water, 4.1 grams of the L-520 block copolymer of polyethylene glycol and dimethylsiloxane, 0.1 gram of tetramethylbutanediamine, 1.0 gram of N-methylmorpholine, 0.20 gram of stannous octoate, 20.5 grams of tris(dibromopropyl) phosphate, and 100.3 grams of tolylene disocyanate (80% 2,4- and 20% 2,6-isomers). The resulting foam was resilient, and had a density of about 2 pounds per cubic foot, and was flame resistant.

Example 10

The polyol preparation of Example 9 was repeated, using 45.3 grams of ethylene glycol in place fo the glycerol. The product weighed 763 grams, and had a theroetical equivalent weight of 525.

A coating formulation was prepared by mixing 191 grams of the above polyol, 16.5 grams of 1,3-butylene glycol, 49.3 grams of trimethlyolpropane, 2.3 grams of di-t-butyl-p-cresol, 5.0 grams of cellulose acetate butyrate, 173 grams of urethane-grade Cellosolve acetate, 173 grams of dry xylene, and 256.0 grams of 2,4-tolylene diisocyanate.

When coated out onto a glass plate, the above formulation dried to give a hard, tough, adherent coating. Similar results were obtained on a sanded wood board.

Example 11

A urethane casting was prepared from the polyol of Example 10. First, a prepolymer was prepared by mixing 52.5 grams of the polyol with 263 grams of 2,4-tolylene diisocyanate and heating the mixture at 80° C. for 1 hour. The resulting prepolymer was then cooled to 30° C. Then 19.9 grams of finely ground methylene bis(o-chloroaniline) were mixed in, and the mixture heated at 80° C. in a closed mold for 12 hours. The resultant casting was hard and tough, and flame resistant.

Example 12

Example 5 was repeated, using an equal weight of 3,3,3-trichloropropylene oxide, in place of the epichlorohydrin. Results similar to those of Example 5 were obtained.

I claim:

1. A hydroxyl-terminated composition having an equivalent weight of from 75 to 1500 prepared by coreacting in intimate admixture at a temperature of from about 75° C. to about 175° C. (1) the adduct of an aldehyde selected from the group consisting of chloral and bromal and an alkane polyol having from two to fifteen carbon atoms and from two to eight hydroxyl radicals, said adduct containing at least 0.1 mol of said aldehyde per hydroxyl radical, with (2) from one to five mols per aldehyde residue of an aliphatic monoepoxide of the formula

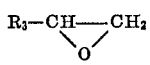

wherein $R_3$ is a radical selected from the group consisting of hydrogen, lower alkyl radicals, lower chloroalkyl radicals and lower bromoalkyl radicals.

2. The product produced by the process of claim 1, wherein the said aldehyde is chloral.

3. The product of claim 2, wherein the said epoxide is propylene oxide or ethylene oxide.

4. The product of claim 2, wherein the said polyol has from 3 to 6 hydroxyl radicals.

5. The product of claim 2 wherein the said polyol has at least 4 hydroxyl radicals.

6. A hydroxyl-terminated composition having an equivalent weight of from 75 to 1500 prepared by coreacting in intimate admixture at a temperature of from about 75° C. to about 175° C. (1) an aldehyde selected from the group consisting of chloral and bromal, (2) an alkane polyol having from two to fifteen carbon atoms and from two to eight hydroxyl radicals, and (3) from one to five mols per mol of said aldehyde of an aliphatic monoepoxide of the formula

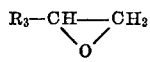

wherein R is a radical selected from the group consisting of hydrogen, lower alkyl radicals, lower chloroalkyl radicals, and lower bromoalkyl radicals, wherein 0.1 to 10 mols of said aldehyde per hydroxyl radical are employed.

7. The product of claim 6, wherein the said aldehyde is chloral.

8. The product of claim 7, wherein the said epoxide is propylene oxide or ethylene oxide.

9. The product of claim 7, wherein the said polyol has from 3 to 6 hydroxyl radicals.

10. The product of claim 7, wherein the said polyol has at least 4 hydroxyl radicals.

References Cited

UNITED STATES PATENTS

| | | | |
|---|---|---|---|
| 2,214,352 | 9/1940 | Schoeller et al. | 260—615 B |
| 2,253,723 | 8/1941 | Moore | 260—615 B |
| 2,450,079 | 9/1948 | Brown | 260—615 BUX |
| 2,681,370 | 6/1954 | Husted et al. | 260—615 A |
| 2,784,237 | 3/1957 | Bruce | 260—615 A |
| 2,786,081 | 3/1957 | Kress | 260—615 A |
| 2,796,401 | 6/1957 | Matuszak et al. | 260—615 AX |
| 2,796,423 | 6/1957 | Cottle et al. | 260—615 AUX |
| 3,150,190 | 9/1964 | Kress | 260—615 A |

FOREIGN PATENTS

| | | | |
|---|---|---|---|
| 1,233,842 | 2/1967 | Germany | 260—615 A |
| 1,033,732 | 6/1966 | Great Britain | 260—615 A |
| 1,037,323 | 7/1966 | Great Britain | 260—615 A |

HOWARD T. MARS, Primary Examiner

U.S. Cl. X.R.

20—77.5 AP, 77.5 AQ, 209, 210, 233.3, 609 F